United States Patent [19]

Ritrosi et al.

[11] Patent Number: 5,749,389

[45] Date of Patent: May 12, 1998

[54] PURGEABLE CONNECTION FOR GAS SUPPLY CABINET

[75] Inventors: Joe Ritrosi, Crystal Lake, Ill.; Gary Schmitt, Scotts Valley, Calif.; Carl Quintino, San Jose, Calif.; Gerhard Kasper, Walnut Creek, Calif.

[73] Assignee: Liquid Air Corporation, Walnut Creek, Calif.

[21] Appl. No.: 173,398

[22] Filed: Dec. 22, 1993

[51] Int. Cl.$^6$ .................................. B08B 9/02; B08B 9/06
[52] U.S. Cl. .................. 137/15; 134/166 C; 134/169 C; 137/240; 222/148
[58] Field of Search .................... 137/240, 1, 15, 137/883, 884, 625.42; 134/166 C, 169 R, 169 C; 222/148

[56] References Cited

U.S. PATENT DOCUMENTS

| | | | |
|---|---|---|---|
| 4,169,486 | 10/1979 | Otteman et al. | 137/240 |
| 4,383,547 | 5/1983 | Lorenz et al. | 137/240 |
| 4,869,301 | 9/1989 | Ohmi et al. | 134/169 R |
| 4,917,136 | 4/1990 | Ohmi et al. | 137/240 |
| 5,137,047 | 8/1992 | George | 137/240 |
| 5,163,475 | 11/1992 | Gregoire | 137/597 |
| 5,240,024 | 8/1993 | Moore et al. | 137/38 |
| 5,368,062 | 11/1994 | Okumura et al. | 137/240 |

Primary Examiner—George L. Walton
Attorney, Agent, or Firm—Jeffrey L. Wendt

[57] ABSTRACT

A method and system for purging an ultra-high purity gas supply manifold comprising: a process connection through which ultra-high purity gas is communicated to a process; a first pigtail conduit in selective flow communication with a high purity gas source; a second pigtail conduit in selective flow communication with said process connection; means for creating a vacuum and means for selectively placing said vacuum means in communication with said first pigtail; an ultra-high purity process gas source; a block valve assembly comprising an inlet port in flow communication with said process gas source, a first outlet port in selective communication with said purge gas supply through connection with said first pigtail and second outlet port in selective communication with said process connection through connection with said second pigtail.

6 Claims, 5 Drawing Sheets

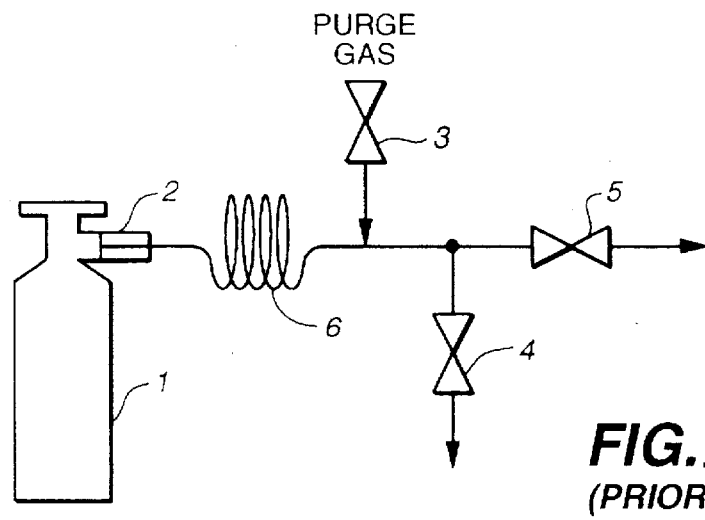
FIG._1A
*(PRIOR ART)*
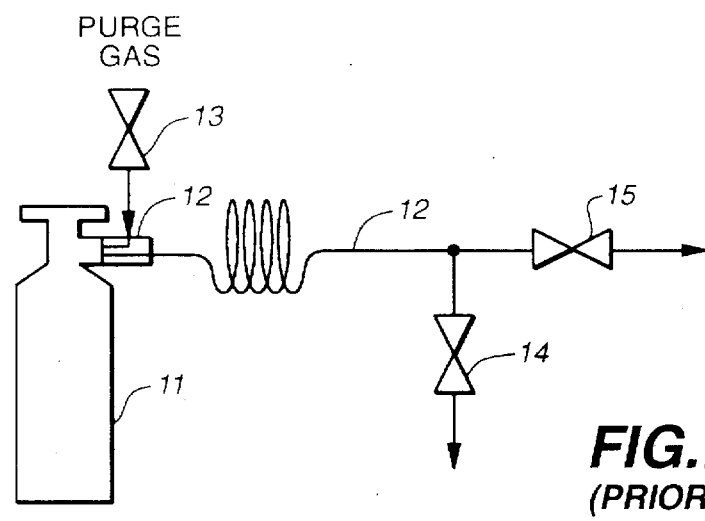
FIG._1B
*(PRIOR ART)*
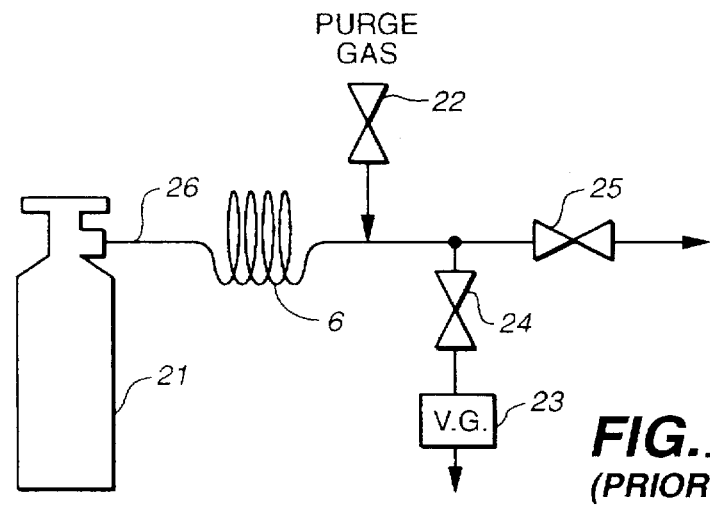
FIG._1C
*(PRIOR ART)*

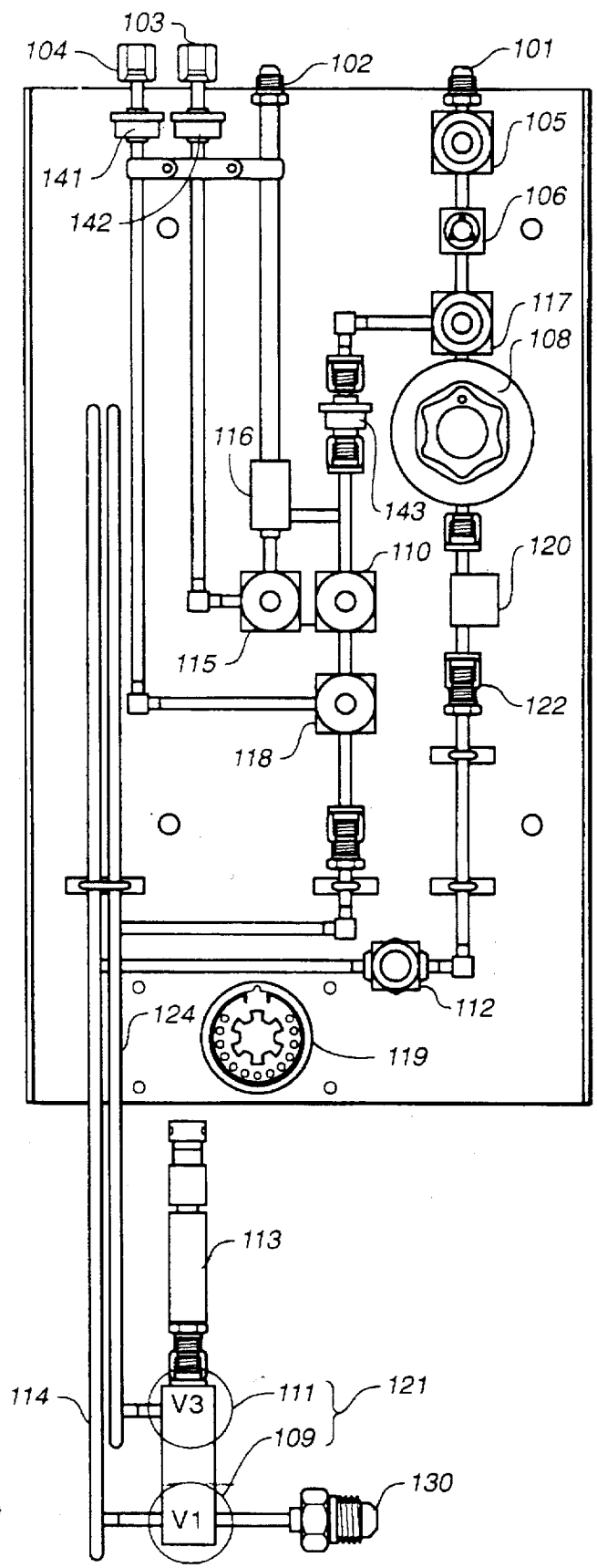
FIG._2

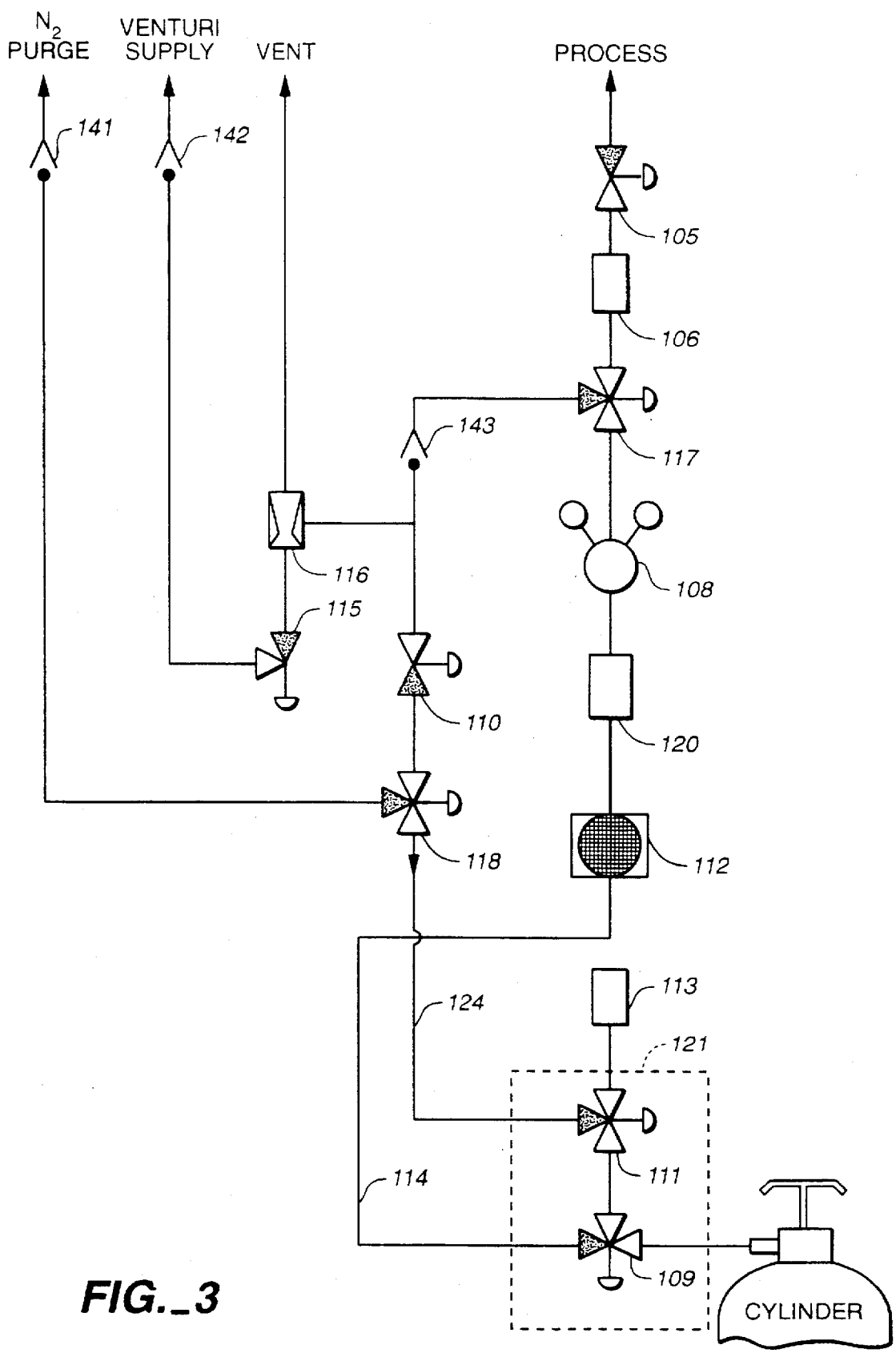
FIG._3

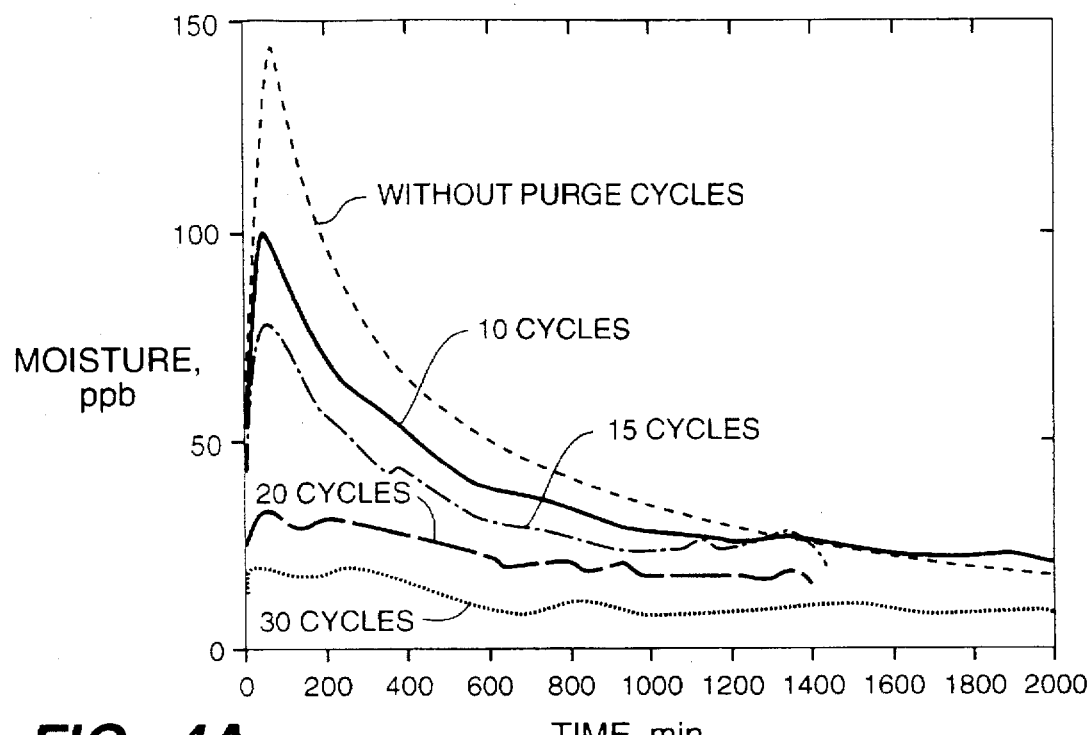
FIG._4A
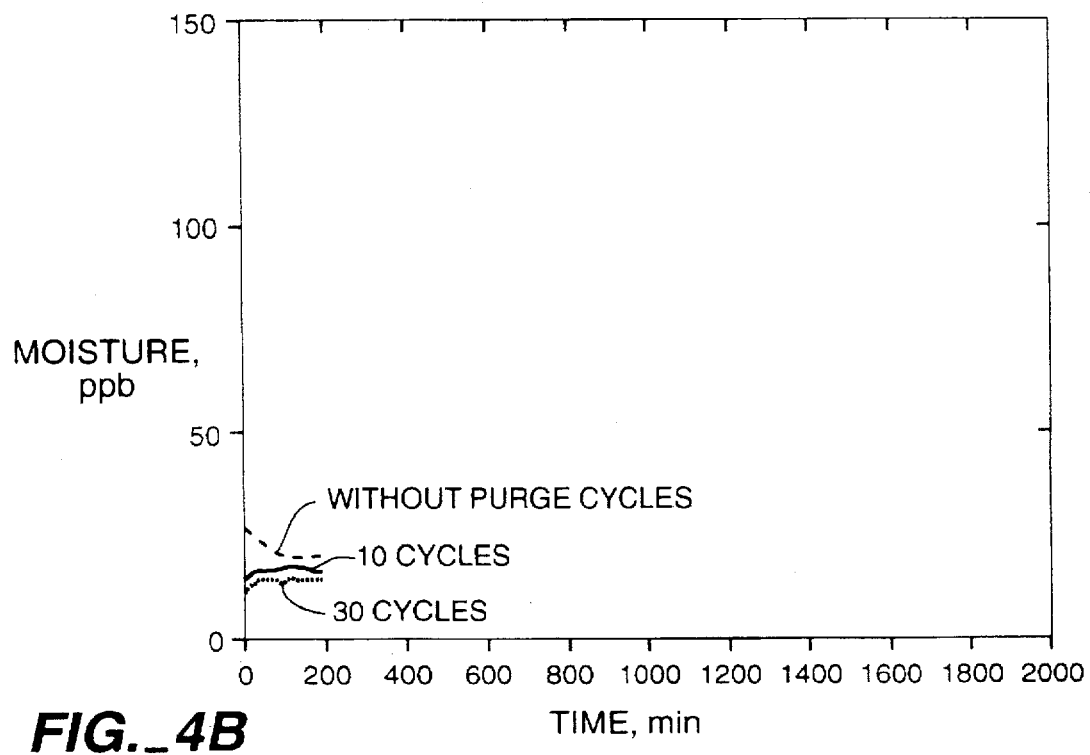
FIG._4B 5,749,389

PURGEABLE CONNECTION FOR GAS SUPPLY CABINET

FIELD OF THE INVENTION

The present invention relates to the handling of high purity gases. More specifically, it relates to a method and associated apparatus for minimizing contamination during gas cylinder exchange procedures.

BACKGROUND OF THE INVENTION

It has become increasingly important in a number of various and diverse industries to have a source of ultra-high purity process gas. For example, reactive ultra-high purity gases such as Silane, Arsine, Diborane, Phosphine, Hydrogen Bromide and $WF_6$ are widely used in the semiconductor industry in the manufacture of integrated circuitry. With semiconductors, as individual elements approach submicron ranges, thin film etching processes require "ultra-high" purity gases containing extremely low levels of measurable contamination. Without such a reliable source of gas and environment for film-making and etching, the ability to fabricate defect-free devices may be adversely affected.

Of particular concern is the entry of contamination into the flow conduit valves and connections during the change-out procedure of an empty high-purity gas cylinder and its replacement. At present, there are several basic techniques used in the industry to purge a control manifold in the process of a gas cylinder exchange. The most widely used techniques are known as "dilution", "flush-flow", "cross-purge" and "deep-purge".

Dilution purging is a succession of manifold pressurizations and depressurizations. Typically, the manifold and flowlines containing process gas are vented to a low-pressure system maintained at or below atmospheric pressure. The control manifold is thereafter pressurized, typically to several atmospheres, with a purge gas and again vented to the low-pressure or vacuum system. Each successive application of venting and pressurizing constitutes a purge cycle. The procedure is repeated for a predetermined number of cycles over a period of time until the process gas concentration reaches a low level considered safe and clean for the semiconductor fabrication process.

Flush-flow purging is the application of a continuous flow of purged gas through the control manifold for a predetermined period of time. The process gas concentration is reduced through entrainment and displacement by the purged gas. The characteristics of the flush flow purge are at best suited for reducing the level of contamination in a consistent cross section, straight-path configuration of gas flow conduit. However, certain volumes and "dead-end" spaces tend to be avoided with the flush flow purging technique. Furthermore, obstructions in the flow path tend to create flow at ease in the purged gas path, and therefore tend to reduce the effectiveness of a flush flow purge in reducing overall contamination.

An older technique of cross-purge comprises mounting three valves on the cylinder and does not include the use of pigtails for flexibility. Such a configuration is depicted in FIG. 1(D).

FIG. 1(A) depicts a typical cross-purge configuration whereby UHP gas cylinder 1 containing high purity gas at high pressure is fed through control valve/cylinder connection 2. Typically, gas travels through a process line depicted by "pigtail" 6 for feeding a process gas through valve 5. Purging takes place by closing valve 2 and applying the purge gas through valve 3 which is exhausted through exhaust valve 4. Although this process provides for some contaminant removal, too much "dead volume" is left in "pigtail" 6 and cylinder connection 2 to adequately remove sufficient contamination. The cross-flow technique is no longer considered acceptable for use with reactive process gases.

Deep-purge has been practiced by introducing purge gas at or near the cylinder valve connection. For example, a system may be provided for supplying gas to within about 2 inches of the cylinder valve outlet. FIG. 1(B) depicts a deep purge procedure whereby UHP gas cylinder 11 is functionally attached to connector 12 which further embodies valve 13 for the introduction of purge gas through line 16 and exhaust valve 14. Deep purge provides improved contaminant removal in light of purge gas introduction through valve 13 at connector 12. As such, deep purge eliminates the "dead volume" in the "pigtail" and particularly in the cylinder connection itself. By maintaining process valve 15 in a closed condition, purging is generally accomplished by several pressure cycles, that is, by opening and closing exhaust valve 14, line 16 can be pressurized and depressurized. In doing so, deep purge is effective in removing contaminants in the "dead volume" of the cylinder connection, but due to a large remaining surface area to be pursued, is still not effective in removing contaminants absorbed on the surface of components.

Another problem with the deep purge process is that it is not possible to protect the cylinder valve connection from ambient contaminants by flowing an inert gas through the connecting pieces during cylinder change-out. Unfortunately, even with the deep-purge technique, the entire gas supply pigtail must be purged, as the entire pigtail length has been exposed to impurities.

FIG. 1(C) depicts the more current method of implementing the "cross-flow" technique which further includes the use of a vacuum generator 23 to accelerate the evacuation of the manifold; however, presently mandated ultra-low contamination levels are not routinely obtainable in a commercially feasible time period, due in part to large remaining exposed area, and other shortcomings similar to other prior methods.

Clearly, an improved method and apparatus for purging a high-purity gas supply manifold is much desired in the art.

SUMMARY OF THE INVENTION

The present invention provides an improved system for purging an ultra-high purity gas supply manifold. The preferred embodiment of the apparatus of the present invention provides an integrated system of components comprising: a process connection through which ultra-high purity gas is communicated to a process; a first pigtail conduit in selective flow communication with a high purity gas source; a second pigtail conduit in selective flow communication with said process connection; means for creating a vacuum and means for selectively placing said vacuum means in communication with said first pigtail; and an ultra-high purity process gas source. The preferred embodiment further comprises a block valve assembly comprising an inlet port in flow communication with said high-purity process gas source, a first outlet port in selective flow communication with said purge gas supply through connection with said first pigtail, and a second outlet port in selective flow communication with said process connection through connection with said second pigtail.

The high-purity gas sources are preferably supplied to the system in gas cylinders; however, other supply sources may be used in connection the system of the present invention.

Among other factors, an advantage of the present invention is the minimization of flowpath surface area which is exposed to contamination during gas cylinder changeout. Through the system of the present invention, we have significantly decreased the effective volume requiring purge through a reduced arrangement of connection tubing, and thereby enabled a process for cylinder changeout which affords greatly improved results in the avoidance of contamination.

The components of the system of the present invention are preferably assembled in a gas cabinet, and operated by control means known in the art. Further features and advantages of the improved high purity gas supply manifold are described below in detail and with reference to the drawings.

BRIEF DESCRIPTION OF THE DRAWINGS

FIGS. 1(A), 1(B), 1(C), and 1(D) depict prior purging techniques, namely cross-purge, deep purge, vacuum assisted purge, and cylinder mounted cross-purge respectively.

FIG. 2 is an actual view depicting major elements of the preferred gas supply manifold system.

FIG. 3 is a process flow schematic diagram depicting major elements in the preferred system for practicing the invention.

FIGS. 4(A) and 4(B) graphically compare the present invention with prior purging methods.

DETAILED DESCRIPTION OF THE PREFERRED EMBODIMENTS

Figure 1D:
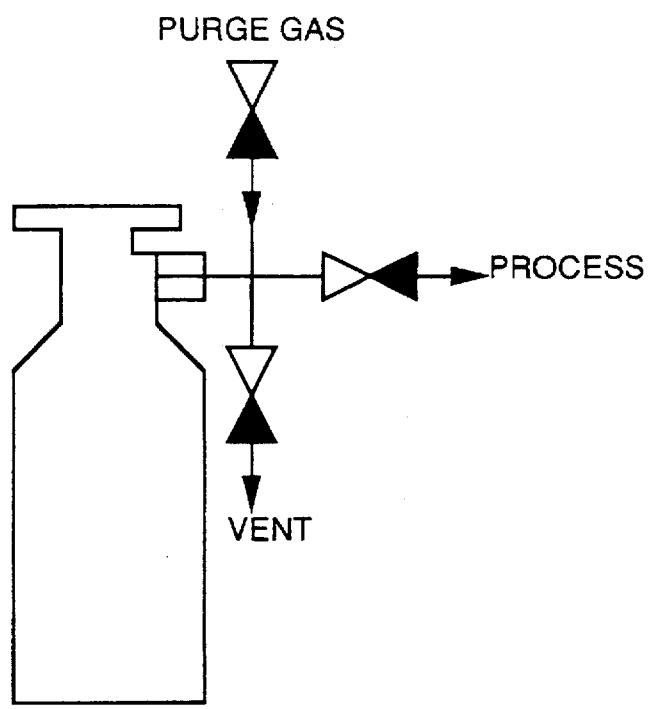

The invention provides a system for purging an ultra-high purity gas supply manifold. The automated gas panel manifold system may be used to supply high purity gases to a process such as, for example, Silane, Arsine, Diborane, $WF_6$, HBr, and Phosphine to a semiconductor fabrication process. The preferred system comprises in cooperation: a process connection through which ultra-high purity gas is communicated to a process; a first pigtail conduit in selective flow communication with a high purity gas source; a second pigtail conduit in selective flow communication with said process connection; means for creating a vacuum and means for selectively placing said vacuum means in communication with said first pigtail; an ultra-high purity process gas source. The system further comprises a block valve assembly which itself comprises an inlet port in flow communication with said process gas source and a first outlet port in selective communication with said purge gas supply through connection with said first pigtail and a second outlet port in selective communication with said process connection through said connection with said second pigtail.

Referring now to FIGS. 2 and 3, various elements of one preferred embodiment of the present invention may be seen. Process line connection 101 is preferably a VCR type fitting and is in flow communication with a process isolation valve 105. Process gas, preferably supplied in cylinders (not shown), is connected to supply gas fitting 130, which fitting is in flow communication with the block assembly 121. Block valve assembly 121 preferably comprises two valves, 109 and 111, and a transducer 113 to monitor pressure within the block valve system. In accordance with preferred embodiments of the present invention, the block valve system comprises a dual block valve assembly comprising two valves effective in operation to isolate the process gas pigtail 114 and components during purging and minimizes the required purge volume. In such operation purging efficiency is significantly increased. The preferred block valve is fabricated by and available from A.P. Tech or Napco and preferably made from 316L or Hastalloy C-22.

In accordance with preferred embodiments of the present invention, a first pigtail 124 is connected to one valve of the block valve system and a second pigtail 114 to the other valve. At the other end of first pigtail 124 and in flow communication therewith, a further embodiment comprises a three-way nitrogen purge valve 118 comprising three ports. The three-port valve in practice comprises two outlet and one inlet port, and may be obtained for example from A.P. Tech, one exemplary source. The inlet of the three-way nitrogen purge valve 118 is fluidly connected to the nitrogen purge supply (not shown) at fitting 104. An outlet of the three-way nitrogen purge valve is connected to low-pressure vent valve 110, and a second outlet is connected to pigtail 124 which is in turn fluidly connected to the block valve assembly 121.

In accordance with the preferred design, only the one valve 118 is required to cycle during the numerous pressure and vacuum cycles, in both the pre-purge and post purge modes of the process gas panels. This prevents excessive valve seat wear on other isolation valves during purging operations, and increases system safety. An automatic check may be done to monitor any seat wear that may occur on the cycling valve 118, to further enhance reliability.

In accordance with preferred embodiments, the low pressure vent valve 117 acts as a pressure relief valve and is utilized to relieve any excessive high pressure process gas safely into the vent in the event of a regulator failure. The vent valve 110 is preferably of the springless diaphragm type and in operation is set to relieve at about 125 psig.

An automatic, user adjustable, pigtail purge bleed is activated during the purging sequence to prevent atmospheric contamination from entering the pigtail the second pigtail 114 during the cylinder change sequence. Upon activation, valve 118 "cracks" open a predetermined amount to allow nitrogen flow during process gas changeout and create positive pressure to prevent the ingress of air through the cylinder connection terminus. The low pressure vent valve, or "relief valve" is preferably plumbed into the vent line connection 102.

The outlet opposite the flow connection with the first pigtail of the vent valve 110 is also in flow communication with vacuum generator means 116. The vacuum generator means is preferably a venturi type vacuum generator receiving a venturi supply gas through connection 103 and selectively actuated valve 115, and venting the supply gas following generation of a vacuum through vent connection 102. The vacuum generator is preferably operated using about 85 psig nitrogen, and the aspirator preferably generates about 22–27 inches of mercury, vacuum. The vacuum level is preferably monitored by either a vacuum switch which may be located on the vacuum generator, or by transducer 113 during purging operations.

As is preferable the case with the major components comprising this system, the vacuum generator is of all welded construction and is surface mounted directly on to the panel. Preferably, in the operation of the gas panel manifold of the present invention, the vacuum generator is in continuous operation during purging. Check valve 143 allows flow from low-pressure vent/relief valve 117 only in the direction towards the vacuum generator and away from the process line. Low pressure venting may be incorporated and utilized to control the vent rate of process gas being vented, before pre-purge. In accordance with further embodiments of the present invention, a 0.040" orifice may be utilized on the vent port of the vacuum generator to restrict the rate of flow during venting into the vent line. Preferably, nitrogen supplied through connection 103 for vacuum generation may be about 99% pure, while nitrogen for purge supplied through connection 104, is at least 99.999%, preferably about 99.9999% pure.

Second pigtail 114 is primarily in fluid communication with process line through valve 112. The process line may optionally contain filter 122, check valves, flow sensor 120, or regulator 108, such as in the example depicted in FIG. 2. Preferably, any check valve employed is hermetically sealed diaphragm type check valves which is utilized to prevent unwanted back streaming of process gas into the nitrogen purge panel. A check valve may also be installed on the venturi supply inlet and downstream of the low pressure vent valve. Preferably, any regulator employed is of the tied diaphragm type, having low internal volume.

The process line may further comprise transducers or isolation valves for flow control and protection against contamination. Preferably, all such valves and regulators are made of 316L Stainless Steel. The standard valves used are preferably of the springless design, diaphragm type with low internal volume. Pneumatic pressure indicators may also be utilized on each valve to give a visual indication that pneumatic pressure is being applied to the valves during operation.

The gas manifold which embodies the present invention may further comprise an excess flow sensor, utilized to monitor any flow disturbances due to line breakage on the system or on the process gas pipe, down stream of the flow sensor panel. The excess flow sensor is typically mounted common to the pigtail of the gas panel. Further, a stainless steel mesh filter may be located on the pigtail to filter unwanted particulate from the cylinder valve and to prevent seat contamination and the failure of components on the gas panel. Pressure transducers, which may comprise removable electronics, may be utilized on the panel and RPV assembly to monitor all purging functions and to give access to cylinder and delivery pressure data. Transducers on the block valve used are preferably flush-mounted. The flush mount transducer is preferably attached to the block valve via internally machined connection located in the body of the block valve. Accordingly, the transducers eliminate any dead space associated with conventional bourdon tube gauges.

All welding is preferably of the butt-weld type and is preferably done with an automatic orbital welder where possible. To help prevent external corrosion, all components, lines and welds are preferably externally electropolished after welding is complete.

COMPARATIVE EXAMPLE

Referring to FIG. 4(A), a gas panel having dual pigtails was employed and moisture downstream in the process was monitored during five purging routines. As dramatically depicted, moisture content initialized below about 50 ppb only after about 20 purge cycles.

Contrasted with FIG. 4(A) is FIG. 4(B), wherein resulting moisture content was measured using the same protocol as the tests leading to FIG. 4(A) downstream from the reduced purge volume gas supply system of the present invention. As shown, the panel of the present invention attained TI moisture spec of less than about 20 ppb almost instantaneously. Moisture after only one purge cycle was determined to be less than that after 20 cycles of the conventional gas supply panel employed above which resulted in the data of FIG. 4(A).

What is claimed is:

1. A system for purging a selected portion of an ultra-high purity gas supply manifold, with a purge gas, said system comprising:

a process connection through which ultra-high purity gas is communicated to a process;

a first conduit in selective flow communication with an ultra-high purity gas source, and with a purge gas source;

a second conduit in selective flow communication with said process connection, and with said ultra-high purity gas source;

a vacuum connection for selectively placing a vacuum means in communication with said first conduit for evacuation thereof during a purge cycle; and a valve means comprising an inlet port in flow communication with an ultra-high purity process gas source, and a first outlet port in selective communication with said purge gas supply through a first connection with said first conduit, and a second outlet port in selective communication with said process connection through a second connection with said second conduit, said valve means adapted to reduce the volume of purging one of the selected first and second conduits during a purging operation with said purge gas by way of said valve means being selectively operable to isolate said first conduit from said inlet port during normal ultra-high purity process gas flow conditions through said second conduit, and further operable to isolate said second conduit from said inlet port during said purging with said purge gas, thereby reducing contaminants in said first and second conduits below acceptable levels.

2. The system in accordance with claim 1 wherein said first and second conduits are pigtail conduits.

3. The system in accordance with claim 1 wherein the valve means comprises two three-way valves, one of said three-way valves having an inlet serving as the inlet port of said valve means, and having a first outlet serving as said second outlet port of said valve means, the second three-way valve having an inlet which is connected to a second outlet of the first three-way valve, and a first outlet connected to the first conduit.

4. The system in accordance with claim 1 wherein said vacuum means is continuously operable throughout a ultra-high purity gas source change-out procedure.

5. A method of supplying an ultra-high purity gas to a process comprising:

flowing an ultra-high purity gas from an ultra-high purity gas source to a process through an ultra-high purity gas source connection and a valve means, said valve means comprising an inlet port in flow communication with an ultra-high purity process gas and a first outlet port in selective communication with a purge gas supply through a first connection with a first conduit and a second outlet port in selective communication with a process connection through a second connection with a second conduit;

disconnecting said ultra-high purity gas source from said ultra-high purity gas source connection;

effecting a purge cycle by selectively operating said valve means to isolate said second conduit from said ultra-high purity gas source connection, and actuating said valve means to flow a purge gas from a purge gas supply through said first conduit and said ultra-high purity gas source connection, and then evacuating said first conduit using a vacuum means connected to said first conduit, said purge cycle thereby reducing the volume of purging of one of said selected first and second conduits, and thereby reducing contaminant levels in said first and second conduits; and connecting a replacement ultra-high purity gas source to said ultra-high purity gas source connection.

6. The method in accordance with claim 5 which further comprises performing at least two purge cycles.

* * * * *